(12) United States Patent
Farnioli et al.

(10) Patent No.: US 12,287,253 B2
(45) Date of Patent: Apr. 29, 2025

(54) FORCE SENSING DEVICE

(71) Applicant: Dyson Technology Limited, Wiltshire (GB)

(72) Inventors: Edoardo Farnioli, Bristol (GB); Iain William Philip Haughton, London (GB)

(73) Assignee: Dyson Technology Limited, Malmesbury (GB)

( * ) Notice: Subject to any disclaimer, the term of this patent is extended or adjusted under 35 U.S.C. 154(b) by 146 days.

(21) Appl. No.: 17/797,067

(22) PCT Filed: Feb. 24, 2021

(86) PCT No.: PCT/GB2021/050466
§ 371 (c)(1),
(2) Date: Aug. 2, 2022

(87) PCT Pub. No.: WO2021/171009
PCT Pub. Date: Sep. 2, 2021

(65) Prior Publication Data
US 2023/0072770 A1    Mar. 9, 2023

(30) Foreign Application Priority Data
Feb. 27, 2020  (GB) .................................... 2002778

(51) Int. Cl.
*G01L 5/00*  (2006.01)
*B25J 13/08*  (2006.01)
(Continued)

(52) U.S. Cl.
CPC ............. *G01L 5/226* (2013.01); *B25J 13/085* (2013.01); *B25J 15/0009* (2013.01); *B25J 15/0206* (2013.01); *G01L 5/16* (2013.01)

(58) Field of Classification Search
CPC .... G01L 5/226; G01L 5/16; G01L 3/14; B25J 13/085; B25J 15/0009; B25J 15/0206; B25J 15/02; B25J 13/081
See application file for complete search history.

(56) References Cited

U.S. PATENT DOCUMENTS

| 3,948,093 A | 4/1976 | Folchi et al. |
| 4,628,745 A | 12/1986 | Hatamura |

(Continued)

FOREIGN PATENT DOCUMENTS

| CN | 102363301 A | 2/2012 |
| JP | 52-006575 A | 1/1977 |

(Continued)

OTHER PUBLICATIONS

Machine Translation of JPS5947185A. Koukichi, Aomori. Robot Hand. Mar. 16, 1984 (Year: 1984).*

(Continued)

*Primary Examiner* — Khoi H Tran
*Assistant Examiner* — Tien Minh Le
(74) *Attorney, Agent, or Firm* — Tucker Ellis LLP; Michael G. Craig

(57) ABSTRACT

A force sensing device for use in a robotic finger including: a first segment, the first segment having a first joint at a first end thereof; a second segment, the second segment being connected to the first segment by a second joint; and a third segment, the third segment being connected to the second segment by a third joint; and torque sensor for sensing the torque at each of the joints when a force is applied to the third segment. The first, second and third joints are disposed within the same plane and are disposed in a triangular arrangement.

13 Claims, 6 Drawing Sheets

(51) Int. Cl.
    *B25J 15/00*     (2006.01)
    *B25J 15/02*     (2006.01)
    *G01L 5/16*     (2020.01)
    *G01L 5/22*     (2006.01)

(56) References Cited

U.S. PATENT DOCUMENTS

| | | | |
|---|---|---|---|
| 4,921,396 | A | 5/1990 | Asakawa et al. |
| 2010/0071222 | A1* | 3/2010 | Solomon ............... G01F 1/32 33/556 |
| 2010/0077867 | A1 | 4/2010 | Ihrke et al. |
| 2010/0138039 | A1* | 6/2010 | Moon ............... B25J 15/0009 700/245 |
| 2011/0068595 | A1* | 3/2011 | Ihrke ............... B25J 15/08 901/32 |
| 2012/0239195 | A1 | 9/2012 | Summer et al. |
| 2014/0035306 | A1 | 2/2014 | Garcia et al. |
| 2018/0029221 | A1* | 2/2018 | Tanaka ............... B25J 9/0081 |
| 2018/0215054 | A1* | 8/2018 | Brudniok ............... B25J 19/02 |
| 2018/0243928 | A1 | 8/2018 | Haddadin |
| 2021/0394362 | A1* | 12/2021 | Sodeyama ............... B25J 9/163 |

FOREIGN PATENT DOCUMENTS

| | | | |
|---|---|---|---|
| JP | 59-047185 | A | 3/1984 |
| JP | S5947185 | A * | 3/1984 |
| JP | 01-316193 | A | 12/1989 |
| JP | 06-335886 | A | 12/1994 |
| JP | 2007-245326 | A | 9/2007 |

OTHER PUBLICATIONS

International Search Report and Written Opinion received for PCT Patent Application No. PCT/GB2021/050466, mailed on Jul. 12, 2021, 11 pages.

Search Report for GB Patent Application No. 2002778.5, Issued on Aug. 28, 2020, 1 page.

Office Action received for Japanese Patent Application No. 2022-551806, mailed on Aug. 29, 2023, 12 pages (7 pages of English Translation and 5 pages of Original Document).

* cited by examiner

FORCE SENSING DEVICE

CROSS-REFERENCE TO PRIOR APPLICATION

This application is a § 371 National Stage Application of PCT International Application No. PCT/GB2021/050466 filed Feb. 24, 2021, which claims the priority of United Kingdom Application No. 2002778.5, filed Feb. 27, 2020, each of which are herein incorporated by reference in their entirety.

TECHNICAL FIELD

The present invention relates to a force sensing device. Aspects of the invention relate to a force sensing device, a method of determining force components of a contact force acting on a force sensing device, to a robot gripper comprising a force sensing device and to a robot comprising a robot gripper.

BACKGROUND

Robot devices comprising robotic hands and gripper arrangements (which may also be referred to herein as robot or robotic grippers) are known in industries such as the manufacturing industry. It is often a key capability of such robot devices that they are able to manipulate a range of objects.

The contact force arising from the interaction between the robotic gripper and an object may be determined by placing sensors within a fingertip of a robotic gripper. However, such arrangements are limited in that they may either be complex (requiring a large number of force sensors to be deployed in the contact surface of the gripper) or only able to determine the normal component of the contact force acting on the robotic gripper.

It is an object of the present invention to provide a robot gripper that mitigates or substantially mitigates the above problems.

SUMMARY OF THE DISCLOSURE

According to an embodiment of the present invention there is provided a force sensing device for use in a robotic finger comprising: a first segment, the first segment having a first joint at a first end thereof; a second segment, the second segment being connected to the first segment by a second joint; and a third segment, the third segment being connected to the second segment by a third joint; torque sensing means for sensing the torque at each of the joints when a force is applied to the third segment; wherein the first, second and third joints are disposed within the same plane and are disposed in a triangular arrangement.

The present invention provides for a force sensing device comprising three segments and three associated joints which are arranged in a triangular arrangement. The torque at each joint is sensed by a torque sensing means. Advantageously, such an arrangement allows a contact force at the third segment to be sensed and the components of that force, both normal and tangential to the surface of the third segment, to be determined along with the location of the contact force.

The torque sensing means may comprise an output for outputting torque data for the three joints to a control unit. In this way the torque data may be used in combination with details of the joint geometry and the geometry of the contact surface of the third segment to determine the force components of a contact force acting on the force sensing device.

The torque sensing means may comprise torque sensors associated with each of the first, second and third joints. Conveniently each joint may be associated with a torque sensor such that the torque experienced at each joint can be accurately determined.

The torque sensor may be provided by a force sensor located at a known distance from its associated joint. In one arrangement, a channel may be provided through the force sensing device within the same plane that the joints are located in and each channel comprises a force sensor at one end of the channel and a joint at the other end of the channel.

The three joints of the force sensing device may be non-rotatable joints that are capable of limited flex and movement only when a contact force is present.

In an alternative arrangement, the first joint may be rotatable. For example, the first joint may be a joint between phalanxes of a robotic gripper or between a base (palm) section of a robotic gripper and a phalanx. Such an arrangement would allow an entire phalanx of a robotic gripper to operate as the force sensing device. The second and third joints in this arrangement may only be able to flex slightly such that there is sufficient movement at the second and third joints to compress or stress the force sensor.

The third segment may be arranged to cover at least some of the other segments. It is noted that the force sensing arrangement according to the present invention allows a force (both normal and tangential components) acting on the third segment to be calculated. Such a calculation is possible by virtue of the presence of the three joints and their triangular arrangement. However, if a force were to contact the first or second segments then there would be an insufficient number of joints and torque data to resolve the force components. In order to provide a more effective force sensing device the third segment may be configured to cover the first and second segments such that a contact force always contacts the third segment thereby allowing the force components to be resolved. In a linear arrangement of first, second and third segments, the third segment may be "folded over" such that it covers the first and second segments.

The third segment may be surrounded by a cover which is arranged to extend over the first and second segments, the cover being separated from the first and second segments by an air gap. This arrangement is an alternative to folding the third segment over the other parts of the device. The cover is arranged to "shield" the first and second segments such that contact with an object over the region of these segments is actually made with the cover instead which results in all three joints experiencing a change in torque which can be sensed.

The force sensing device may comprise a fourth joint and the torque sensing means may be arranged to determine the torque at the fourth joint, the fourth joint being located out of the plane of the first, second and third joints. Conveniently the provision of an out of plane location at which torque may be sensed enables the component of a force acting out of the plane of the first, second and third joints to be determined.

According to an aspect of the present invention there is provided a method of determining force components of a contact force acting on a force sensing device according to the above aspect of the present invention, the method comprising: measuring the torque at each of the joints of the force sensing device when an object contacts a surface of the third segment of the force sensing device at a contact point; determining from the torque measurements the location of the contact point and the force components of the contact force.

The method may further comprise: defining the contact point for the contact force relative to one of the joints in the triangular arrangement of joints within the force sensing device; defining the torque at each joint in terms of the force components of the contact force, the dimensions of the triangular arrangement of joints in the force sensing device and the contact point of the contact force;

The force components may comprise the force component normal to the surface of the third segment at the contact point and the force component tangential to the surface of the third segment at the contact point. When the force sensing device is incorporated into a robotic gripper the capability to determine the tangential force component of a contact force enables such a robotic gripper to determine the weight of an object to be lifted by gripping the object and determining the tangential force exerted by the object as the gripper lifts the object.

It is noted that the order of the steps in the above method according to the present disclosure may be varied slightly depending on the particular implementation of the method, e.g. certain steps may occur together or in a different order to that shown above.

According to an aspect of the present invention there is provided a robotic gripper comprising: a base section; a first finger comprising a proximal phalanx which is connected to the base section by a joint; a second finger comprising a proximal phalanx which is connected to the base section by a joint; wherein at least one phalanx comprises a force sensing device.

The forces sensing device according to the present invention may advantageously be incorporated into robotic gripper to enable the gripper to determine the forces resulting on the gripper when an object is gripped. Conveniently a force sensing device may be incorporated into all potential contact surfaces of a robotic gripper, e.g. each phalanx of the robotic gripper may comprise a force sensing device.

According to an aspect of the present invention there is provided a robotic gripper according to the above aspect of the present invention comprising a control unit that is configured to carry out the method of the present invention.

Within the scope of this application it is expressly intended that the various aspects, embodiments, examples and alternatives set out in the preceding paragraphs, in the claims and/or in the following description and drawings, in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the disclosure will now be described, by way of example only, with reference to the accompanying drawings, in which.

DETAILED DESCRIPTION

General and specific embodiments of the disclosure will be described below with reference to the Figures. Like numerals have been used to denote like features within the figures.

Figure 1:
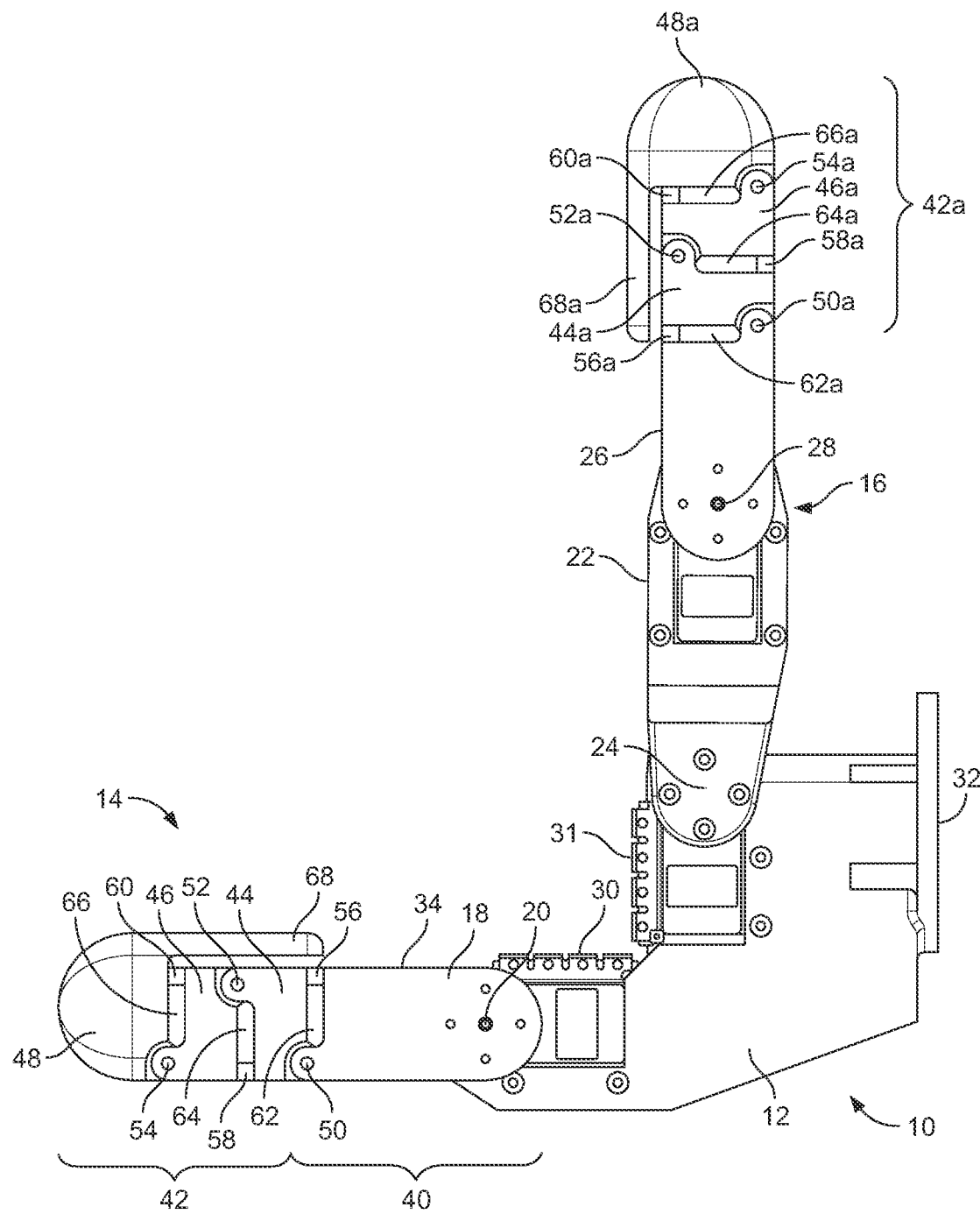
FIG. 1 shows a side view of a robotic gripper comprising a force sensing device, the gripper in an open configuration according to an embodiment of the present invention.

FIG. 1 shows a side view of a robot gripper 10 according to an embodiment of the present invention. The gripper 10 comprises a base section 12, a first finger 14 and a second finger 16.

The first finger 14 comprises a first, or proximal, phalanx 18 which is connected to the base section 12 by a joint 20. The second finger 14 comprises a first (proximal) phalanx 22 which is connected to the base section 12 by a (base) joint 24. The second finger 16 further comprises a second (distal) phalanx 26 which is connected to the adjacent proximal phalanx 22 by a (phalanx) joint 28. The first and second fingers (14, 16) are opposable to one another.

As shown in FIG. 1, the base section comprises a first inner surface 30 and a second inner surface 31 which are arranged at 90 degrees to each other. These inner surfaces (30, 31) of the base section comprise a textured surface to aid gripping of objects. This surface could for example comprise a rubberised material. The robot gripper additionally comprises a wrist connection 32 to enable connection of the gripper 10 to a robot arm (not shown in FIG. 1).

FIG. 1 shows the gripper 10 in a fully open configuration in which the surface 30 of the base section 12 and the inner surface 34 of the first finger 14 are parallel to each other. Additionally, the first and second phalanxes (22, 26) of the second finger 16 define a straight line which is parallel to the inner surface 31 of the base section 12. As shown in FIG. 1, the first finger 14 is at 90 degrees to the second finger 16.

For the robot gripper 10 shown in FIG. 1 there are an odd number of joints (in this case 3 joints) and an odd number of phalanxes. The presence of a hand having an uneven number of phalanxes in the opposable fingers results in a "handed" gripper 10 which enables the fingers of the gripper to perform gripping and pinching actions as well as more complicated actions such as rolling an object between the two opposable fingers.

Figure 2:
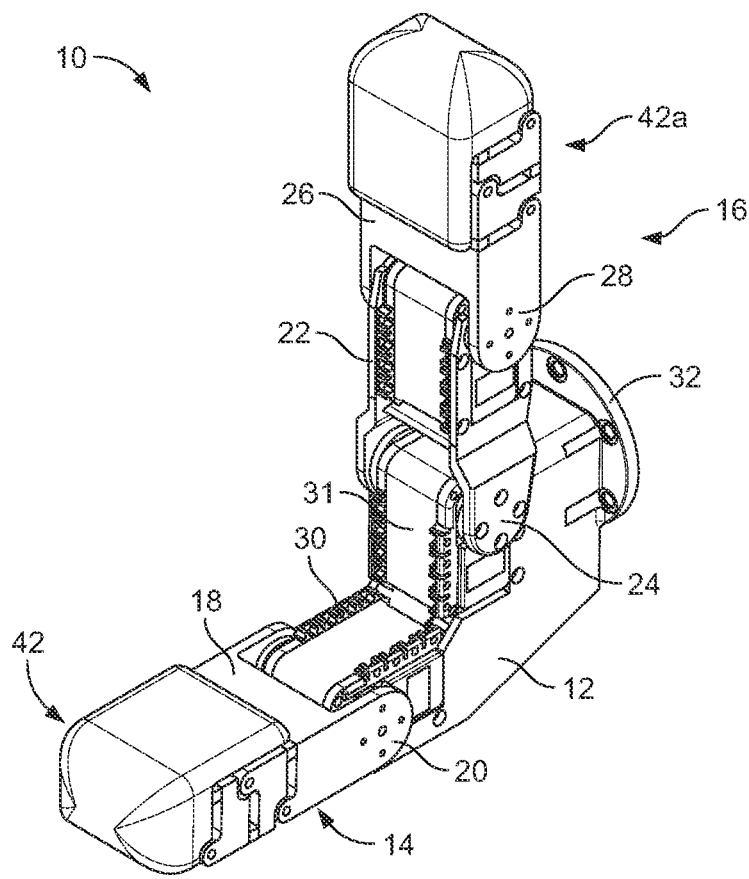
FIG. 2 shows a perspective view of the robotic gripper of FIG. 1.
Figure 3:
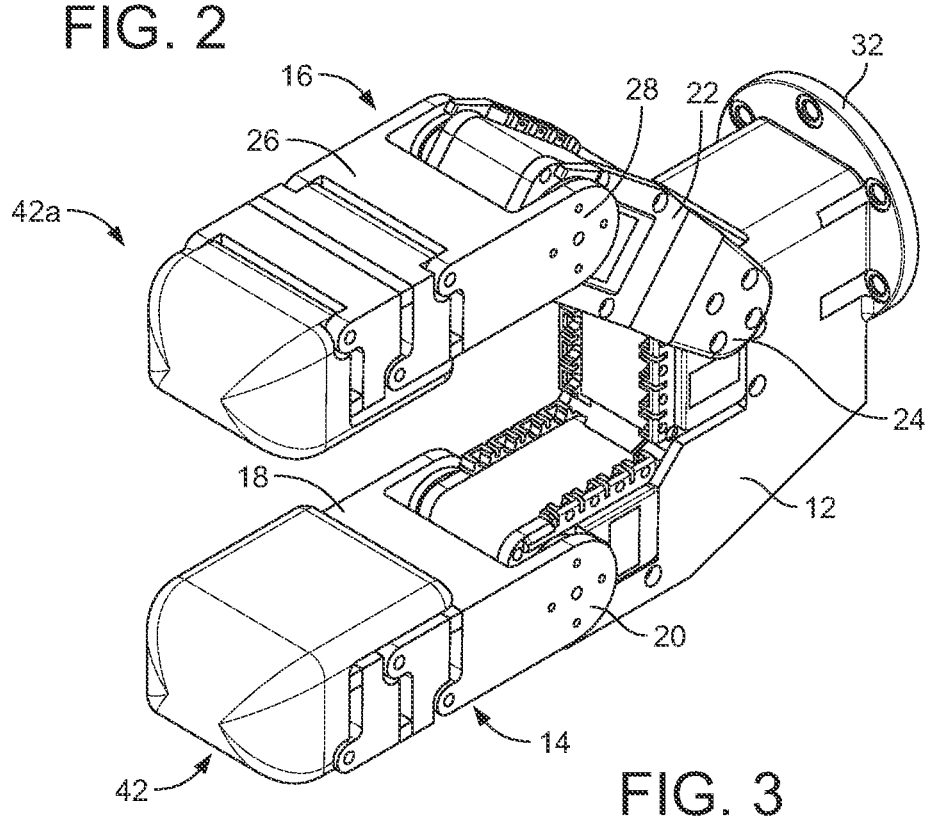
FIG. 3 shows a perspective view of the robotic gripper of FIG. 1 in an alternative open configuration.

FIG. 2 shows the gripper 10 of FIG. 1 in a perspective view. FIG. 3 shows the gripper of FIG. 1 in a further perspective view in which the gripper is in a further "open" configuration in which the second phalanx 26 of the second finger 16 is parallel to the phalanx 18 of the first finger 14.

Each joint (20 24, 28) is rotatable about an axis. As shown in FIG. 1, the axes of each joint (20, 24, 28) are parallel to one another and perpendicular to the plane of the figure. Each joint comprises its own motor such that the robot gripper is fully actuated thereby aiding the gripping positions that the gripper can take up.

The motor for each joint may be directly associated with the joint. Such an arrangement would facilitate replacing the gripper that is connected to the wrist connection with a replacement gripper (in the case of damage) or alternative robotic manipulators. Alternatively, the motor for each joint may be located remote from the gripper 10 (e.g. within an arm attached to the gripper 10 via the wrist connection 32) and may be connected to the joint via a suitable mechanical or hydraulic tendon system. This arrangement may enable a less bulky design for the gripper compared to directly locating the motors with each joint within the gripper.

The gripper may be rotatable about the wrist connection to enable the gripper to move between a first handed position and a second handed position.

Each finger (14, 16) of the robotic gripper shown in FIG. 1 (and FIGS. 2 and 3) is additionally provided with a force sensing device. As described below the force sensing device may be used to identify the contact point location of a force acting on the robotic fingers (e.g. from contact with an object). The force sensing device may additionally be used to determine the normal and tangential forces (relative to the surface of the finger) of the force acting on the finger.

As shown in FIG. 1, phalanx 18 of finger 14 comprises a base segment 40 (which incorporates the joint 20) and a force sensing device 42 (located at the tip of the phalanx 18 distal from the base section 12). The force sensing device comprises first, second and third segments (44, 46, 48), the three segments being arranged such that the first segment 44 is adjacent to the base segment 40 of the finger 14.

The first segment 44 comprises a first joint 50 between the base segment 40 and the first segment 44. The second segment 46 is connected to the first segment 44 by a second joint 52. The third segment 48 is connected to the second segment by a third joint 54.

It is noted that the joints 50, 52, 54 are not rotatable joints and the three segments 44, 46, 48 are substantially fixed relative to one another. The three segments are not however incapable of any motion relative to one another and when a force acts on the finger 14 there will be slight compression or stretching of the structure of the finger 14. Consequently, there will be some minor relative motion between the three segments when the finger contacts an object.

The force sensing device 42 further comprises a torque sensing means which in FIG. 1 takes the form of three force sensors 56 (located between the base segment 40 and first segment 44), 58 (located between the first and second segments (44, 46)), 60 (located between the second and third segments (46, 48)).

As shown in FIG. 1, the joints (50, 52, 54) and force sensors (56, 58, 60) are located at either end of channels (62, 64, 66) that run perpendicular to the longitudinal axis of the finger 14.

The third segment 48 is shaped such that it comprises a cover portion 68 that partially covers the first segment 44 and second segment 46. In FIG. 1 it can be seen that the third segment is folded over such that a cover portion 68 covers the inner surface 34 of the first and second segments.

The first, second and third joints (50, 52, 54) are disposed in the same plane and are further disposed in a triangular arrangement. As discussed in detail with reference to FIG. 7 below this arrangement of joints allows both the normal and tangential components of a force acting on the third segment 48 to be determined.

Finger 16 comprises a force sensing device 42a of corresponding configuration to the force sensing device 42 on finger 14. Corresponding features of the force sensing device 42a have been labelled (e.g. first, second and third segments (44a, 46a, 48a), joints (50a, 52a, 54a), force sensors (56a, 58a, 60a), channels (62a, 64a, 66a) and cover portion 68a).

The output of the torque sensing means in the force sensing devices 42 and 42a may be sent to a control unit (not shown) which may determine the force applied to a gripped object as discussed in further detail below in relation to FIGS. 6 and 7.

The control unit may additionally be configured to send control signals to the motors that control operation of the gripper 10.

In FIGS. 1 to 3 the force sensing devices (42, 42a) are shown in the tip of the fingers (14, 16). Alternative configurations of robotic fingers comprising force sensing devices according to embodiments of the invention are possible.

For example, as shown on finger 14 the force sensing device 42 is at the tip of the phalanx 18 and the phalanx also comprises a base segment 40. In an alternative configuration the force sensing device 42 may extend across the entire length of the phalanx 18. In such an alternative configuration a separate first joint 50 may not be required and the base joint 20 may be used instead as part of the force sensing device 42 (i.e. the base joint 20 forms the "first joint" of the force sensing device 42). In such a configuration the first joint of the first sensing device 42 is a rotatable joint whereas the second joint 52 and third joint 54 are substantially fixed as described above.

In a further alternative configuration, each phalanx of a robotic finger (e.g. phalanxes 22, 26 in finger 16) may comprise a force sensing device 42.

Figure 4:
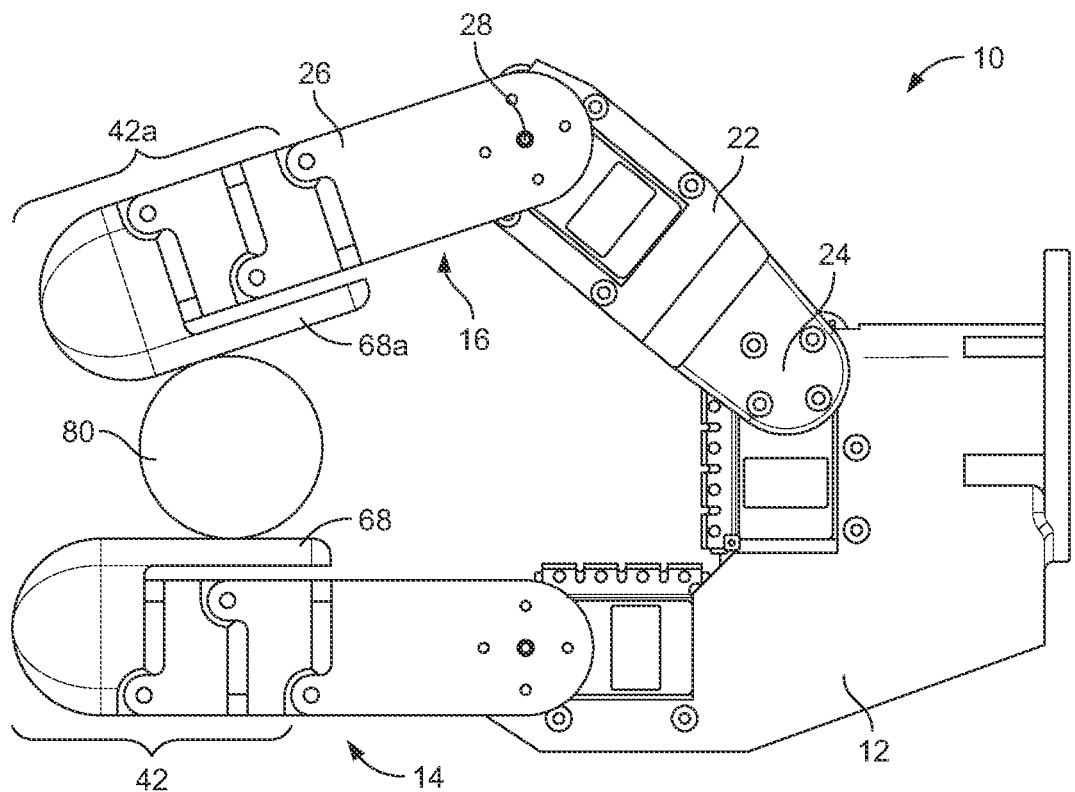
FIG. 4 shows a side view of the robotic gripper of FIG. 1 gripping an object.
Figure 5:
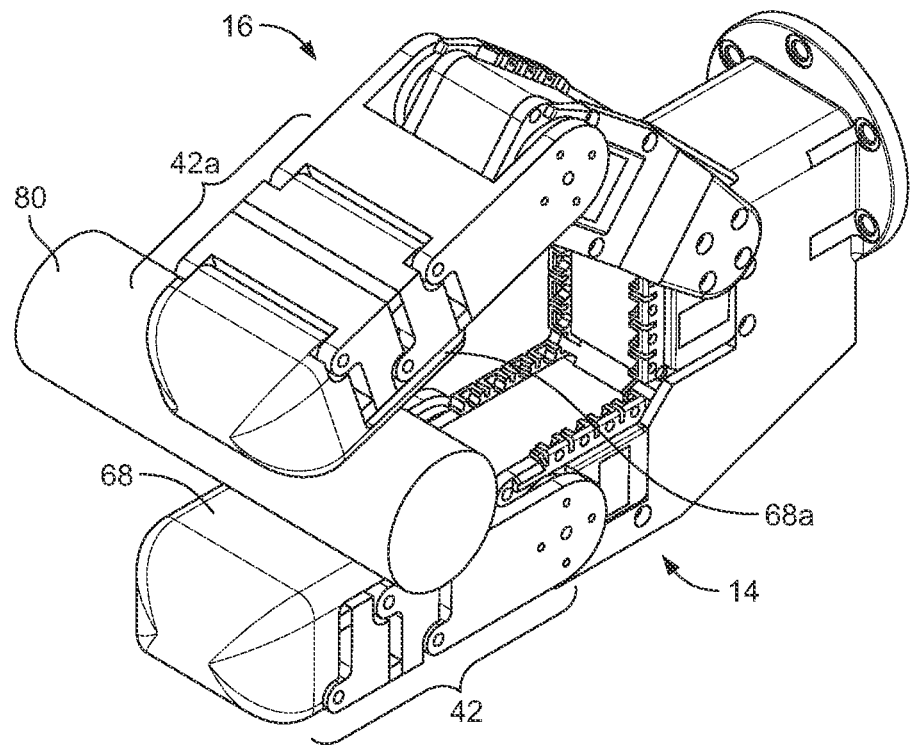
FIG. 5 shows a perspective view of the robotic gripper of FIG. 1 gripping an object.

FIGS. 4 and 5 show the gripper 10 of FIG. 1 as it interacts with an object 80. As can be seen from the figures the object 80 contacts the cover portions (68, 68a) of the force sensing devices (42, 42a).

Figure 6:
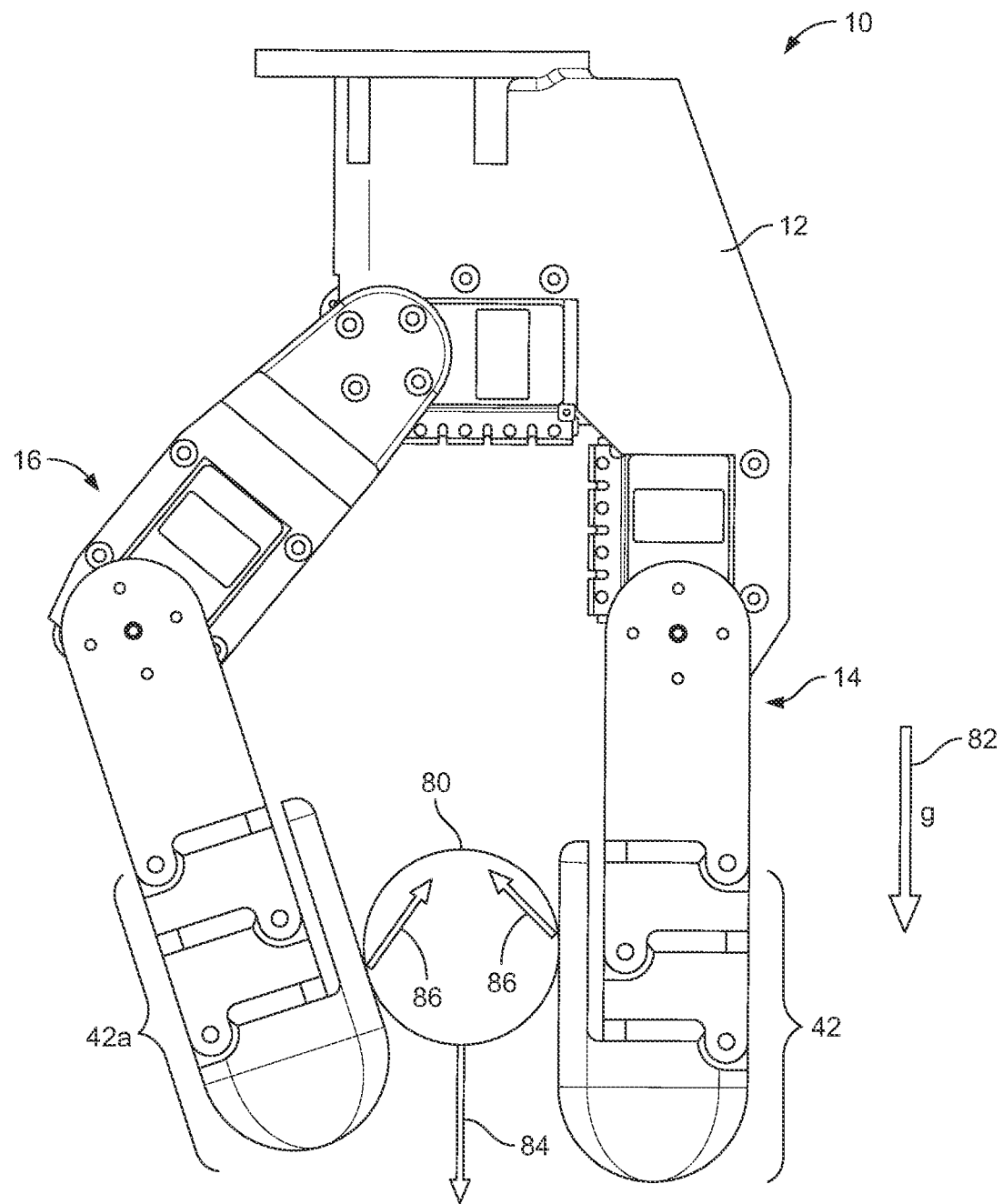
FIG. 6 shows a plan view of the robotic gripper of FIG. 1 gripping an object.

FIG. 6 shows a side view of a gripper 10 according to FIGS. 1 to 5 gripping an object 80 in a vertical grasp. The figure shows the direction 82 of gravity and the weight 84 of the object 80. Contact forces 86 from the gripper 10 that act on the object are also shown.

Figure 7:
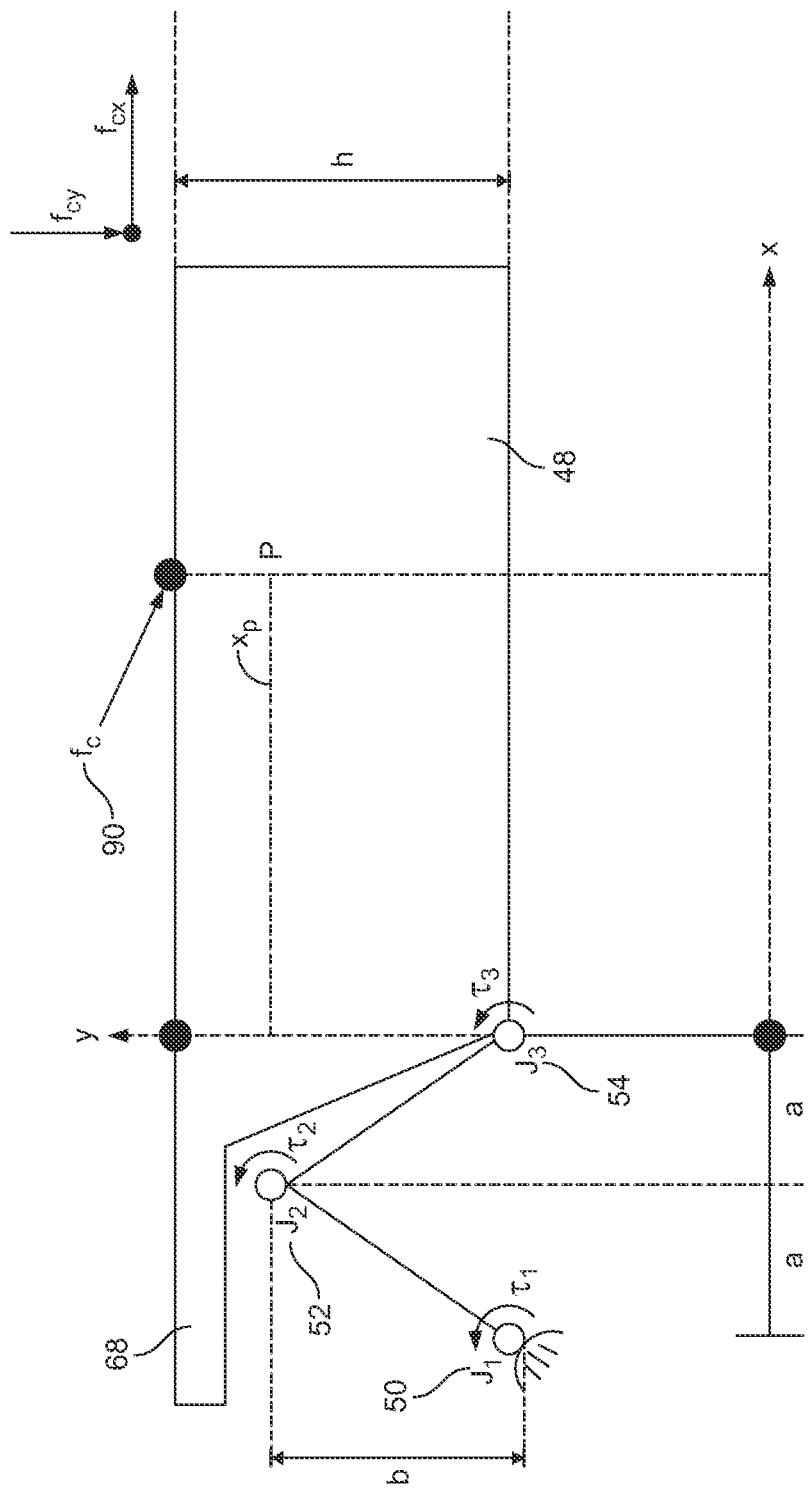
FIG. 7 shows a side view of the third segment of a force sensing device and a contact force.

FIG. 7 shows a simplified view of a gripper 10 in order to demonstrate the components ($f_{cx}$, $f_{cy}$) of the force $f_c$ acting on the gripper 10 when the gripper interacts with an object.

FIG. 7 shows the third segment 48 of a force sensing device 42 along with the cover portion 68 and first joint 50, second joint 52 and third joint 54.

As also shown in FIG. 1, the three joints (50, 52, 54) of the force sensing device 42 are in the same plane (the plane of the figure) and arranged in a triangular configuration.

As shown in FIG. 7, the triangle formed by the three joints is isosceles or equilateral with base dimensions $2a$ and height from base (joints 50, 54) to apex (joint 52) of dimension $b$.

In FIG. 7 the x axis is parallel to the longitudinal axis of the finger segment 48 and the y axis is perpendicular to the longitudinal axis, the x, y axes being in the same plane as the three joints (50, 52, 54). Taking joint 54 as an origin point, the contact force 90 is located at ($x_p$, $h$).

The torque at non-rotating joint 50, as measured by the force sensor 56, is $\tau_1$; the torque at non-rotating joint 52, as measured by force sensor 58, is $\tau_2$ and the torque at non-rotating joint 54, as measured by force sensor 60, is $\tau_3$.

The three torques caused by the external force can be expressed as $$\begin{cases} \tau_3 = -(f_{c_y}x_p + f_{c_x}h) \\ \tau_2 = -(f_{c_y}(x_p + a) + f_{c_x}(h - b)) \\ \tau_1 = -(f_{c_y}(x_p + 2a) + f_{c_x}h) \end{cases}$$

that can also be expressed as $$\begin{cases} \tau_3 = -f_{c_y}x_p - f_{c_x}h \\ \tau_2 = -f_{c_y}x_p - f_{c_y}a - f_{c_x}h + f_{c_x}b \\ \tau_1 = -f_{c_y}x_p - f_{c_y}2a - f_{c_x}h) \end{cases}$$

then the term $f_{c_y}$ can be obtained computing $$\tau_3 - \tau_1 = 2f_{c_y}a$$

from which it follows $$f_{c_y} = \frac{\tau_3 - \tau_1}{2a}$$

then the term $f_{c_x}$ can be obtained computing $$\tau_2 - \tau_3 = -f_{c_y}a + f_{c_x}b$$

from which it follows $$f_{c_x} = \frac{\tau_2 - \tau_3 + f_{c_y}a}{b}$$

Considering the expression already computed for the term $f_{c_y}$ we can write $$f_{c_x} = \frac{(1-a)\tau_3 + a\tau_2 - \tau_1}{ab}$$

At this stage at computation time both terms $f_{c_x}$ and $f_{c_y}$ can be considered known. Then the equation for $\tau_3$ can be used to obtain $x_p$ as follows:

$$\tau_3 = -f_{c_y}x_p - f_{c_x}h$$

$$x_p = -\frac{\tau_3 + f_{c_y}h}{f_{c_y}}$$

In the above manner the x and y components of a force fc acting on the third segment 48 of the force sensing means can be determined along with the contact point location of that force.

In the arrangement shown in FIG. 7 the profile of the segment is constant since the top surface of the segment 48 (i.e. the surface upon which $f_c$ acts) is a horizontal straight line across the extent of the segment in the x direction (in other words the depth of the segment 48 is a constant value h). It is noted however that the force may also be calculated for different profiles of the third segment, e.g. h(x)=mx+q (an inclined line) or as a quadratic curve.

As shown in FIG. 7, force $f_c$ acts in the plane of the figure. In the event that force $f_c$ has a component acting in or out of the plane of the paper (i.e. in a z axis direction where the z axis is perpendicular to the plane of the figure) then a fourth force sensor (not shown) may be mounted on the robot gripper 10 in order to determine the component $f_{cz}$.

Figure 8:
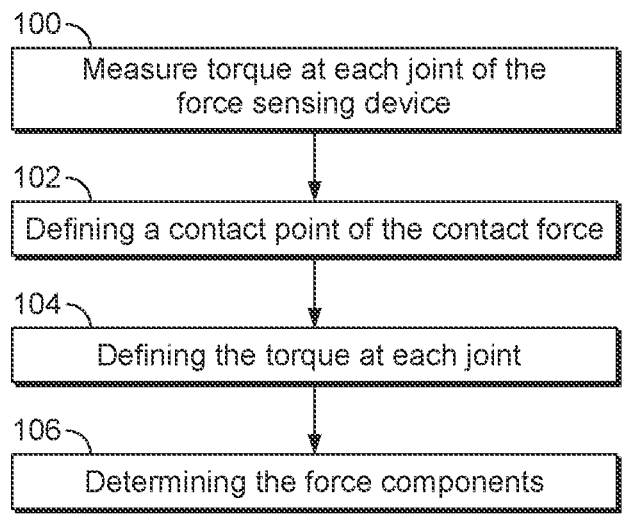
FIG. 8 is a flow chart showing the calculation of force components of a contact force according to an embodiment of the present invention.

FIG. 8 is a flow chart showing the process of determining the components of a contact force acting on the gripper 10 when the gripper interacts with an object can be calculated.

In step 100 the torque at each joint (50, 52, 54) of the force sensing device 42 is measured as an object contacts the surface of the third segment.

In step 102, the contact point 90 of the contact force $f_c$ is defined relative to one of the joints of the triangular arrangement of joints (as discussed above in relation to FIG. 7 this contact point is $x_p$, h).

In step 104 the torque at each point is defined in terms of the force components of the contact force, the dimensions of the triangular arrangement of joints in the force sensing device and the contact point of the contact force.

In step 106, the force components of the contact force at the contact point can be determined from the measured torque values. As shown above in relation to FIG. 7 the value of the force components ($f_{cx}$, $f_{cy}$ may be defined entirely in terms of parameters that are known (the dimensions of the triangular arrangement of joints) or may be measured (the torque measurements at the three joints).

Figure 9:
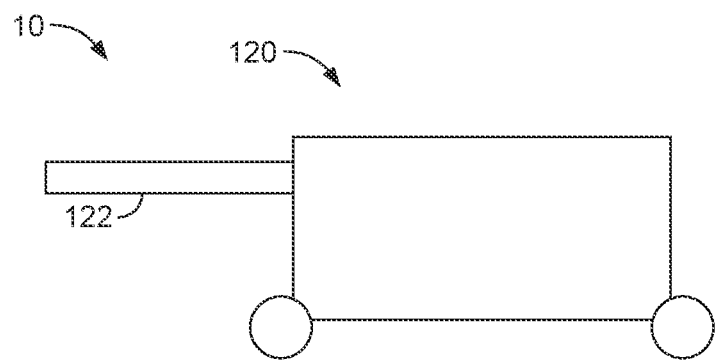
FIG. 9 shows a robot comprising a robot gripper.

FIG. 9 shows a robot 120 comprising an arm 122 and a robot gripper 10 according to any of the above FIGS. 1 to 7.

Many modifications may be made to the above examples without departing from the scope of the present disclosure as defined in the accompanying claims.

The invention claimed is:

1. A force sensing device for use in a robotic finger comprising:
    a first segment, the first segment having a first joint at a first end thereof, wherein the first segment is sized and shaped to be operably fixed to a distal end of a base segment of a phalanx at the first joint;
    a second segment, the second segment being connected to the first segment by a second joint; and
    a third segment, the third segment being connected to the second segment by a third joint;
    a first channel disposed between the first segment and the base segment, a second channel disposed between the second segment and the first segment, and a third channel disposed between the third segment and the second segment; and
    a torque sensing means for sensing the torque at each of the joints when a force is applied to the third segment, wherein the torque sensing means comprises a torque sensor respectively disposed in the channels, wherein the corresponding joint is disposed at an opposite end of the channels from the torque sensor;
    wherein the first, second and third joints are disposed within a same plane and are disposed in a triangular arrangement.

2. The force sensing device as claimed in claim 1, wherein the torque sensing means comprises an output for outputting torque data for the three joints to a control unit.

3. The force sensing device as claimed in claim 1, wherein points of connection of the first, second and third joints are disposed within the same plane, axes of rotation for the respective first, second and third joints are parallel to each other and are perpendicular to the plane, and the points of connection of the first, second and third joints are disposed in a triangular arrangement in the plane, the torque sensing means comprises torque sensors associated with each of the first, second and third joints.

4. The force sensing device as claimed in claim 3, wherein each torque sensor comprises a force sensor.

5. The force sensing device as claimed in claim 1, wherein the first joint is rotatable.

6. The force sensing device as claimed in claim 1, wherein at least a portion of the third segment is arranged to covers over at least some of both of the other segments.

7. The force sensing device, as claimed in claim 1, wherein the third segment is surrounded by a cover which is arranged to extend over the first and second segments, the cover being separated from the first and second segments by an air gap.

8. The force sensing device as claimed in claim 1, comprising torque sensing means at a fourth joint, the fourth joint being located outside of the plane of in which the first, second and third joints are disposed.

9. A method of determining force components of a contact force acting on the force sensing device according to claim 1, the method comprising:
measuring the torque at each of the joints of the force sensing device when an object merely contacts a surface of the third segment of the force sensing device at a contact point;
determining from the torque measurements the location of the contact point and the force components of the contact force.

10. The method as claimed in claim 9, further comprising:
defining the contact point for the contact force relative to one of the joints in the triangular arrangement of joints within the force sensing device;
defining the torque at each joint in terms of the force components of the contact force, dimensions of the triangular arrangement of joints in the force sensing device and the contact point of the contact force.

11. The method as claimed in claim 10, wherein the force components comprise the force component normal to the surface of the third segment at the contact point and the force component tangential to the surface of the third segment at the contact point.

12. A robot comprising the force sensing device according to claim 1.

13. The force sensing device as claimed in claim 1, wherein the base segment of the phalanx, the first segment, the second segment, and the third segment all substantially align along a same longitudinal axis.

* * * * *